United States Patent Office 3,394,294
Patented July 23, 1968

3,394,294
SERVOMOTOR ARRANGEMENT FOR MOVING A MECHANICAL PART ACCORDING TO A PROGRAM
Michel Leroi and André Jeannin, Paris, France, assignors to Societe pour l'Etude et la Realisation des Procedes Electroniques de Calcul "Analac," a corporation of France
Filed Dec. 30, 1964, Ser. No. 422,278
Claims priority, application France, Jan. 3, 1964, 959,275
3 Claims. (Cl. 318—18)

ABSTRACT OF THE DISCLOSURE

The invention provides a servomotor arrangement for moving a mechanical part: This arrangement comprises a motor for moving said part; a transducer transduces in an analog voltage the position of the part; a comparator network receives this analog voltage, on one side, and a programming voltage on the other side, and delivers an error control voltage controlling the motor. A simulating network, simulating the physical characteristics of the arrangement receives also this analog voltage and delivers a signal. This signal is fed also to the comparator network.

In mechanical systems it is often necessary to impress upon a mechanical part a motion following a specific law.

This problem may be difficult to solve when, the part being operated by a motor which applies a force or a couple thereto, the resistant forces or couples, which vary as a function of speed, are so low that the inertia couples or forces are dominant.

It is an object of this invention to provide an arrangement in which this problem is solved.

According to the invention there is provided a servomotor arrangement for moving a mechanical part comprising motor means for moving said part; transducer means transducing in an analog voltage the position of said part; a first feedback loop comprising a comparator network having a first input for receiving said analog voltage, a second input for receiving a programming voltage, a third input, and an output for delivering a control voltage for controlling said motor means; a second feedback loop comprising a simulator network simulating the physical characteristics of said arrangement receiving said control voltage, and an output for delivering a further signal; and means for feeding said further signal to said third input of said comparator network.

For a better understanding of the invention and to show how the same may be carried into effect, reference will be made to the drawings, accompanying the following description and in which:

FIG. 1 shows a motor device 1, which, under the action of an input voltage U delivers a couple C whose sign and intensity depend on the value of voltage V, C being related to U by the relation $C=f(U)$, which is the transfer function of device 1.

Figure 1:
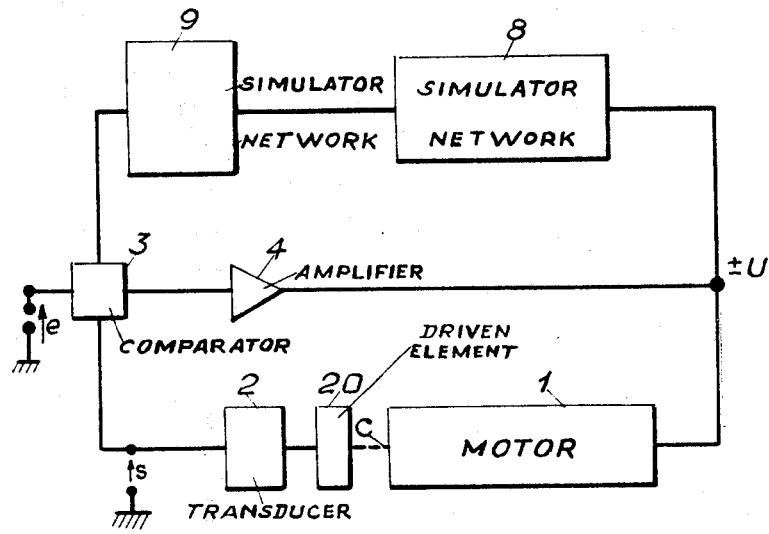
FIG. 1 is a schematic layout of the principle of the invention.

Motor device 1 is coupled to the moving part 20 and coupled in turn to an electro-mechanical transducer 2 which converts the position of the output shaft of motor 1 to a voltage $s$.

Motor-device 1 is controlled through two negative feed-back loops.

A first negative feed-back loop starts from the output of device 2. It comprises a comparator network 3, whose first input receives voltage $s$, while its other input receives an input voltage $e$ whose value as a function of time is determined by the motion programme of part 20.

This first loop controls the motion of part 20 under the action of motor device 1 so that voltage $s$ of the output of transducer 2 shall be equal to voltage $e$. To this end network 3 delivers voltage $e-s$ to an amplifier 4 which delivers to device 3 the voltage U, which is an increasing function of $e-s$ and is equal to zero when $e=s$.

The operation of this arrangement is obvious: device 1 stops as soon as voltage $e$ is equal to voltage $s$, and rotates in a direction such that voltage $s$ has a tendency to make voltage $(e-s)$ equal to zero.

Systems of this kind are well known and are found to operate in a satisfactory manner when voltage $e$ does not vary or varies only slowly. Actually, when voltage $s$ differs from voltage $e$, the only way of reducing the difference between $s$ and $e$ is to apply a signal to motor 1. This signal provides, with a certain delay, a torque (or force) applied to the mechanical part, which is thus accelerated or decelerated.

If, under these conditions, voltage $s$ has become equal to voltage $e$ the signal applied to motor 1 is not cancelled until voltage $s$ has grown beyond voltage value $e$ by an amount which will be all the greater as the variation of the signal applied to motor 1 and the resulting couple will be greater, thus causing oscillation of voltage value $s$ about the value $e$.

The arrangement according to the invention avoids this hunting, or at least reduces its amplitude to a marked extent, in particular in control systems in which the motor comprises clutch mechanisms operated by all or nothing. To this end, there is provided a correction signal which is generated by networks simulating one or more physical characteristics of the mechanical part 20 and the drive system 1.

To this end a second negative feed-back loop is set up between the control input of device 1 and comparator 3, in which an additional correction voltage is generated, which voltage is added to voltage $e-s$.

This loop includes, for example, a simulator network 8, which receives the voltage V which controls motor 1 and generates at its output a voltage which, at every instant, simulates the resulting acceleration of the mechanical part, taking into account the inertia, and a network 9 which receives the output voltages from simulator 8 and generates in its turn an appropriate correction voltage, for example simulating the friction, to be added to the difference of voltages $e$ and $s$ in comparator 3.

Figure 2:
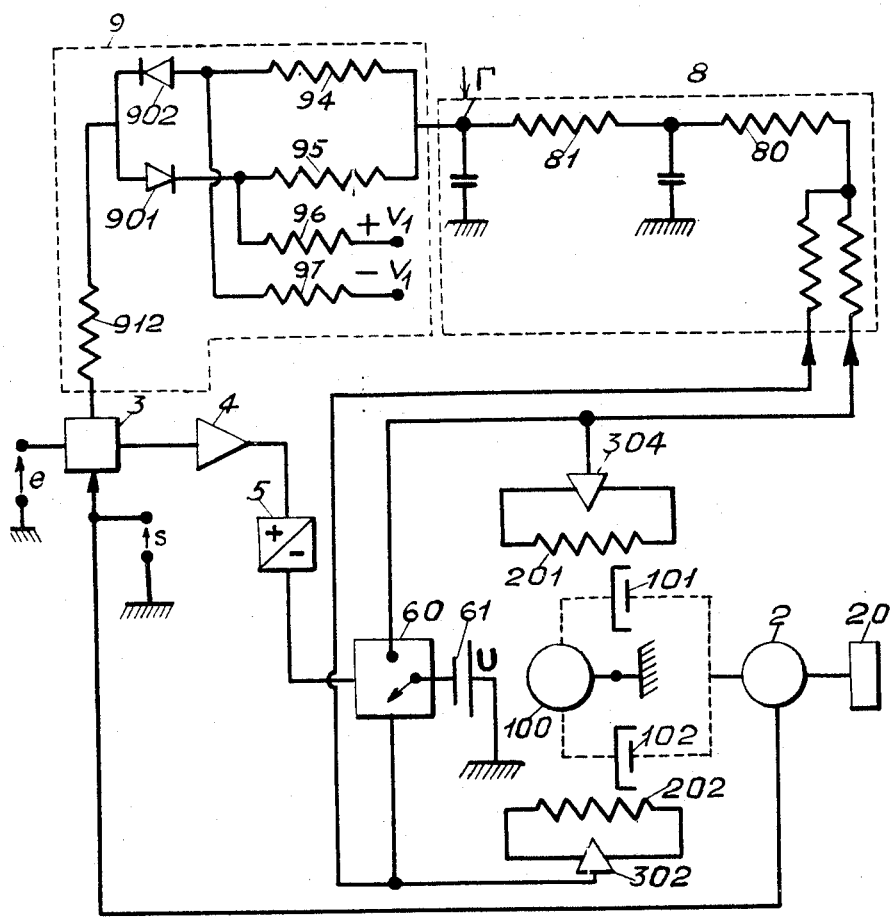
FIG. 2 is a diagram of one embodiment of the invention.

FIG. 2 shows one embodiment of the arrangement according to the invention

In this figure the arrangement includes a motor 100, which, for example, rotates at constant speed.

This motor rotates, through a gear train (not shown), the driving shafts of clutches 101 and 102, at the same speed but in opposite directions. The clutches are respectively operated by two windings 201 and 202, fed from two amplifiers 304 and 302, the latter receiving, through a two-position contactor, a DC voltage U taken from a source 61.

The two clutches control the rotation, in one direction or the other, of the mechanical part 20 and of transducer 2 which supplies the output voltage $s$ indicative of the instantaneous position of part 20. The first negative feed-back loop includes comparator 3 and amplifier 4 of FIG. 1 and a sign detector 5. Network 8 and 9 build up a second loop.

Network 8 consists of two resistance-capacitor networks 80 and 81, providing two time constants, one simulating the response delay of the windings of clutches 101 and 102, and the other the mechanical inertia of part 2 and its associated elements.

As a result, if the input voltage of network 9 is U, the output voltage will be a voltage Γ, proportional to the actual acceleration of part 2, the latter depending on the applied torque and on the inertia of the arrangement.

A second corrector device 9 generates, starting from voltage Γ a correction voltage, which is a function of G, and is added to $e-s$ in cell 3.

This network comprises two resistance bridges 94–95 and 96–97, to which voltages $+U$ and $-U$ are respectively applied, and two push-pull mounted diodes 901 and 902 which feed network 3 through a resistance 912. This network receives voltage Γ at its input and provides at its output a voltage simulating the applied energy and taking into account the friction simulated by the diodes which allow to pass only voltages higher than a predetermined threshold voltage value.

Figure 3:
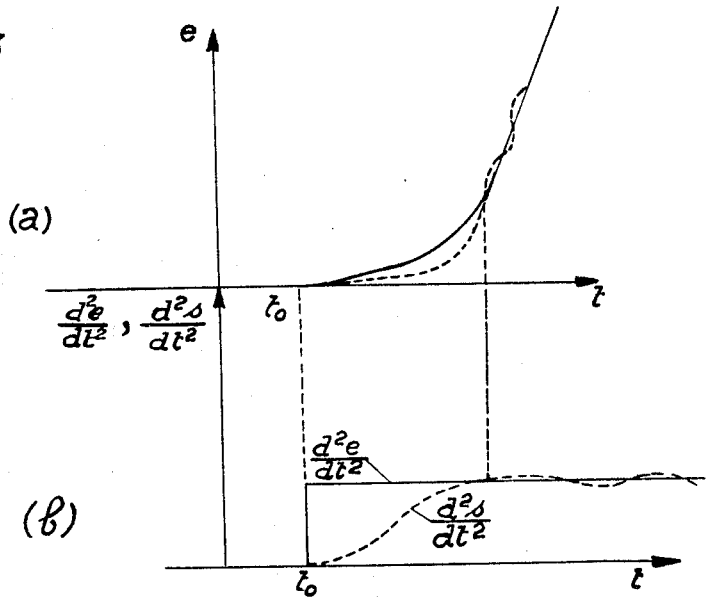
FIG. 3 is an explanatory curve.

Referring to FIG. 3, the latter shows at $a$ voltages $s$ and $e$ as a function of time $t$ and at $b$ voltages $d^2s/dt^2$ and $d^2e/dt^2$ as a function of time $t$.

The arrangement operates as follows:

As shown in FIG. 3, at time $t_0$ a voltage $e$ is assumed to be applied to the system, this voltage varying with time:

$$e = \tfrac{1}{2} e_0 (t-t_0)^2 + e_1(t-t_0) \tag{1}$$

As soon as this voltage is established, voltage U is applied to one of the two clutches.

The derivative is zero when $t < t_0$ and is equal to $e_0$ when $t \geq t_0$.

The resulting voltage $d^2s/dt^2$ representative of the acceleration of part 2 does not follow the Equation 1 because of the inertia of the system, namely of the clutch response delay to voltage U, of the inertia of device 2 and of mechanical part 20, and of friction.

The sign of U depends on the sign of $d^2e/dt^2$.

The effect of the corrector network 8 is to provide voltage $Γ = d^2s/dt^2$.

Γ is derived from voltage U through two resistance-capacitor networks 80 and 81 and having time constants respectively simulating the inertia of part 20 and the time constant of windings 201 or 202. As already mentioned, the diode network 9 simulates friction and delivers to comparator network 3 the corrector voltage.

The shape of voltage $s$ is then as shown in dotted line in FIG. 3a. It starts with a certain delay, and it can be shown that it catches up with voltage $e$ and that the two curves touch. Voltage $s$ then tends to overshoot voltage $e$. The sign of the difference $e-s$ reverses and the voltage U is applied to the other clutch. The voltage $s$ is then counteracted and a form of hunting is initiated about value $e$. It can be shown that in the present example this oscillation is of very small amplitude.

What is claimed is:

1. A servo-motor arrangement for moving a mechanical part comprising:

motor means for moving said part; transducer means coupled to said part for transducing in an analog voltage, the position of said part; a first feedback loop comprising a comparator network having a first input for receiving said analog voltage, a second input for receiving a programming voltage, a third input, and an output for delivering a control voltage for controlling said motor means; a second feedback loop comprising first simulator network means having an input for receiving said control voltage, delaying means simulating inertial delays and an output for delivering a first output signal, second simulator network means comprising a threshold system, an input receiving said first signal, and an output for delivering a further signal; and means for feeding said further signal to said third input of said comparator network.

2. A servo-motor arrangement for moving a mechanical part comprising:

motor for moving said part; transducer means coupled to said part for transducing in an analog voltage the position of said part; a first feedback loop comprising a comparator network having a first input for receiving said analog voltage, a second input for receiving a programming voltage, a third input, and an output for delivering a control voltage for controlling said motor; means responsive to the sign of said control voltage coupled to said output; a two position switch having a control input coupled to said sign responsive means, a further input, means for applying a D.C. source to said further input and a first and a second output, respectively actuating a first and a second electromagnetic clutch, having respective inputs shafts coupled to said motor, and respective first and second output shafts; having opposite rotation directions; a second feedback loop comprising first simulator network means having an input for receiving said D.C. voltage, comprising delaying means simulating inertial delays of said arrangement and an output for delivering a first output signal, second network means comprising a threshold system simulating the friction of said system, an input receiving said first signal, and an output delivering a further signal; and means for feeding said further signal to said third input of said comparator network.

3. A servo-motor arrangement for moving a mechanical part comprising a constant speed motor for moving said part; transducer means coupled to said part for transducing in an analog voltage the position of said part; a first feedback loop comprising a comparator network having a first input for receiving said analog voltage, a second input for receiving said analog voltage, a second input for receiving a programming voltage, a third input, and an output for delivering a control voltage for controlling said motor; means responsive to the sign of said control voltage coupled to said output; a two position switch having a control input coupled to said sign responsive means, a further input, means for applying a D.C. source to said further input and a first and a second output, respectively actuating a first and a second electromagnetic clutch having respective input shafts, coupled to said motor and respective first and second output shafts; having opposite rotation directions; a second feedback loop comprising first simulator network means having an input for receiving said D.C. voltage, comprising a first resistance capacitor network having a time constant simulating respectively the electrical and the mechanical inertia of said arrangement and an output for delivering a first output signal; second network means comprising a threshold system simulating the friction of said system, an input receiving said first signal, and an output delivering a further signal; and means for feeding said further signal to said third input of said comparator network.

References Cited

UNITED STATES PATENTS

| | | | |
|---|---|---|---|
| 2,913,648 | 11/1959 | Brouwer | 318—28 |
| 3,005,939 | 10/1961 | Fromer et al. | 318—28 |
| 3,179,865 | 4/1965 | Carton | 318—28 |
| 3,209,223 | 9/1965 | Scheib | 318—30 |

BENJAMIN DOBECK, *Primary Examiner.*